United States Patent [19]
Mouille

[11] 3,921,940
[45] Nov. 25, 1975

[54] ASSEMBLY FOR CONNECTING A ROTOR TO A HELICOPTER

[75] Inventor: René Louis Mouille, Aix-en-Provence, France

[73] Assignee: Societe Nationale Industrielle Aerospatiale, Paris, France

[22] Filed: May 29, 1974

[21] Appl. No.: 474,340

[30] Foreign Application Priority Data
June 8, 1973 France ............................. 73.20960

[52] U.S. Cl............. 244/17.27; 248/20; 248/358 R
[51] Int. Cl.².......................................... B64C 27/00
[58] Field of Search........... 244/17.25, 17.27, 17.11; 248/5, 20, 15, 358 R

[56] References Cited
UNITED STATES PATENTS

| | | | |
|---|---|---|---|
| 2,615,657 | 10/1952 | Young et al. ..................... | 244/17.27 |
| 2,739,769 | 3/1956 | Rogers............................. | 244/17.27 |
| 3,502,290 | 3/1970 | Legrand et al................ | 244/17.27 X |
| 3,698,663 | 10/1972 | Balke et al...................... | 244/17.27 |
| 3,845,917 | 11/1974 | Drees.............................. | 244/17.27 |

*Primary Examiner*—Trygve M. Blix
*Assistant Examiner*—Paul E. Sauberer
*Attorney, Agent, or Firm*—Karl W. Flocks

[57] ABSTRACT

As assembly for connecting the lift rotor to a helicopter body filters out vibrations. In the assembly the rotor mast and associated elements form a self-supporting but resiliently deformable system.

11 Claims, 12 Drawing Figures

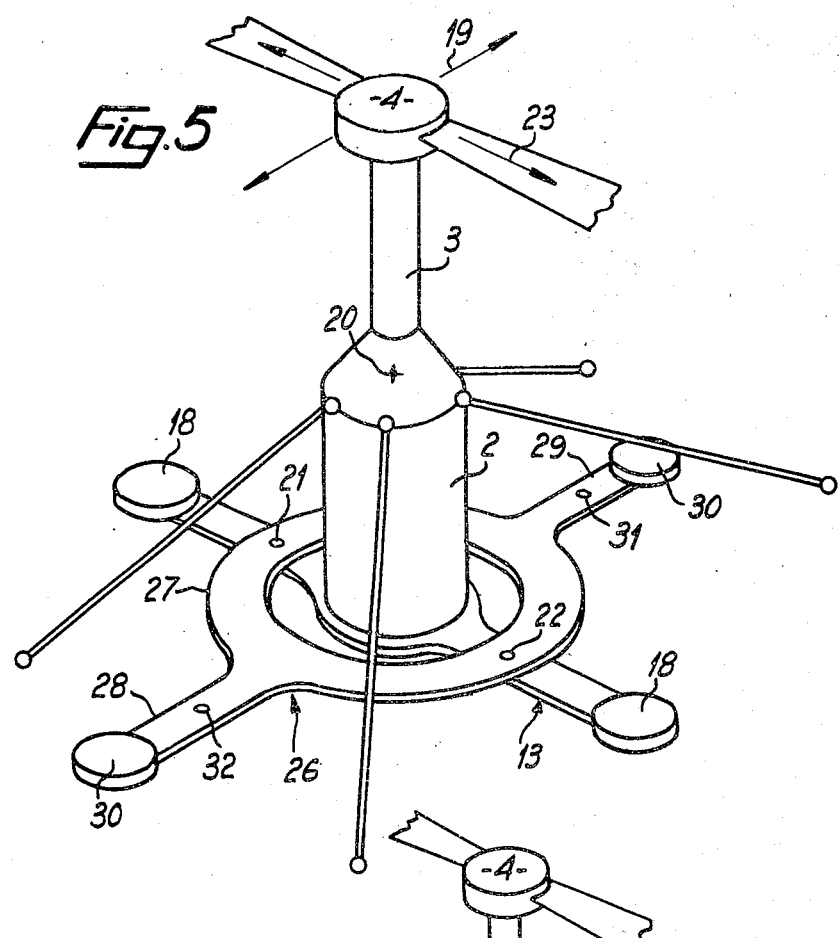
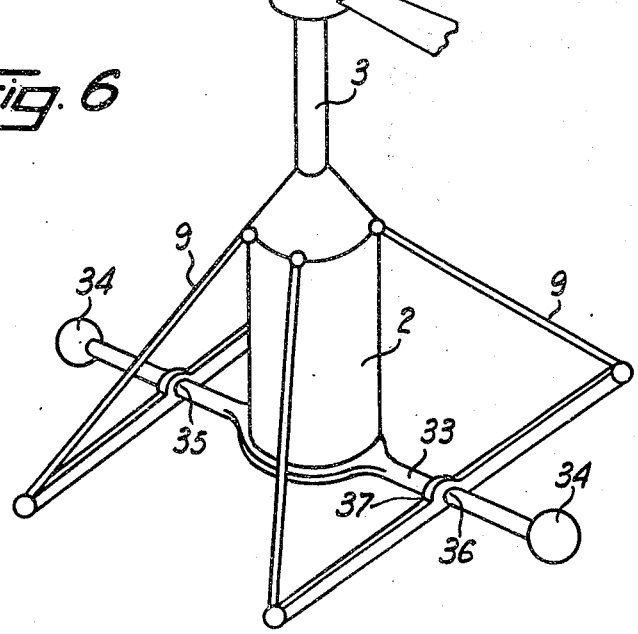

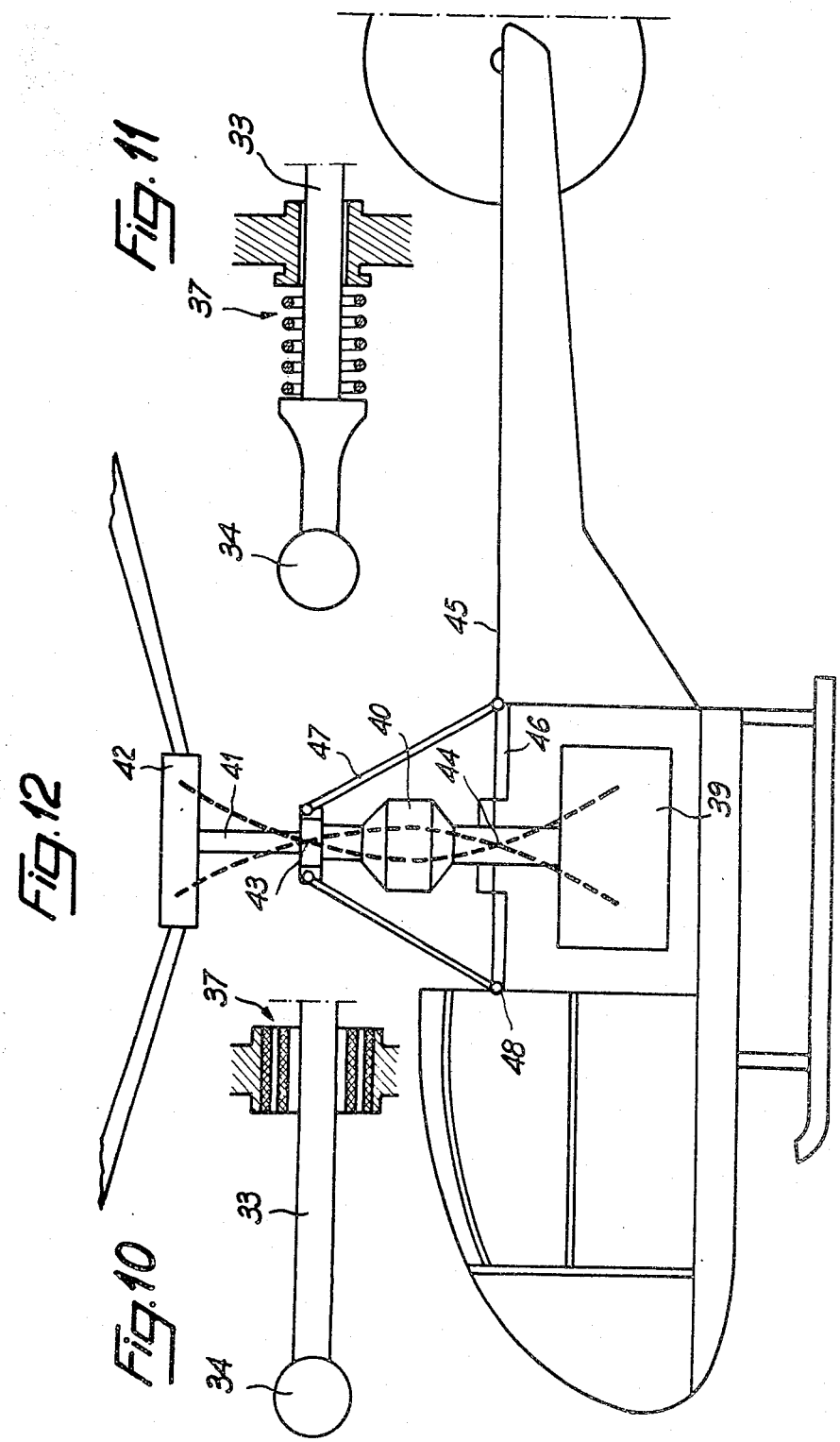

ASSEMBLY FOR CONNECTING A ROTOR TO A HELICOPTER

This invention relates to means for connecting the lift rotor of a helicopter to the fuselage thereof, the means being adapted to filter out or remove vibrations between the rotor and the fuselage.

A main rotor of a helicopter has blades which transmit forces to the hub elements to which the blades are connected, some of such forces being constant and the others being intermittent. The constant forces are the aerodynamic lift and the resultant of the centrifugal forces and can readily be dealt with by the structural elements of the helicopter.

The multiple intermittent or periodic forces mainly comprise vertical forces which arise because of the aerodynamic asymmetry caused by the flight speed and by forces acting in a plane perpendicular to the rotor axis and caused by variations in blade drag. These alternating forces are transmitted to the fuselage where they produce vertical and longitudinal and more particularly transverse vibrations, the latter being the most disturbing both for the flight crew and for passengers.

Helicopter makers have endeavoured to reduce the effects of such vibrations by providing the blades or hub with swinging resonators. Anti-vibration devices in the cabin which are tuned, automatically or otherwise, to the frequency to be neutralized have also been tried. Some present-day techniques reside in the provision of flexible connections between, on the one hand, the system embodied by the transmission box, mast and hub and, on the other hand, the helicopter structure.

With regard to vibration-reducing rotor suspension means, U.S. Pat. No. 3,502,290 of Louis Francois Legrand and Charles Henri Tresch entitled "Vibration Damping Helicopter Rotor Support," issued Mar. 24, 1970, relates to a rotor-to-fuselage interconnection device comprising rigid elements, such as rods disposed inclinedly between the top part of the casing of the main transmission box for transmitting the power of the rotor and the fuselage structure, the rigid elements being adapted to take up the forces applied to the rotor head, and a cut plate forming a grille embodied by a number of strips, the plate working only in its plane in response to the driving torque supplied by the main transmission box and to the action of horizontal forces, to allow, by the bending of the blades, slight alternating movements of the bottom of the transmission box relative to the fuselage.

A construction of this kind provides only incomplete removal of vibrations between the rotor and the fuselage.

This invention relates to means for securing to a helicopter fuselage the system embodied by the rotor, its mast and the reduction mechanism, the means helping to reduce the transmission of vibrations between the rotor and fuselage.

According to the invention, the rotor mast and the elements rigidly secured thereto form a rigid but resiliently deformable elongated system ballasted near its ends and having flexible intermediate portions, the system being adapted to vibrate transversely at a natural frequency very slightly below the frequency to be removed, in a vibration mode causing vibration nodes to appear in the flexible portions, the connecting elements between such systems and the fuselage being disposed at such nodes.

Preferably, the vibration regime is a two-node regime.

The system is connected to the helicopter fuselage at two places near the two vibration nodes, where movements are zero. The top-node connection is in the form of a number of rigid inclined rods connecting the top part of the reduction mechanism above the fuselage, the place on which such rods converge being disposed substantially at the node, this connection being adapted to transmit vertical and horizontal forces due to bending movements of the suspended elements.

The bottom-node connection connects the bottom of the reduction mechanism to the fuselage structure by securing means adapted to transmit from the structure to the fuselage the driving torque and horizontal forces due to bending moments of the suspended elements.

The invention as thus described has a number of considerable advantages.

More particularly, it is very light in weight since it mainly uses vital parts of the helicopter, such as its transmission box, mast and rotor - as components of the vibrating unit whose vibration nodes are taken as the positions for securing to the fuselage structure.

The invention can also be embodied to filter vibrations in one or more directions.

In one form of the invention, size can be reduced by means of a lateral extension on either side of the transmission box which is combined with a flexible suspension of the bottom of such box.

With such a suspension, vibration problems can be dealt with much earlier in the design of the machine and more simply than with conventional constructions since the system formed by the box, mast and rotor can be optimized independently of the fuselage to provide an appropriate location of the nodes and therefore of the places for securing to the fuselage.

The remainder of the description now to be given, taken in conjunction with the accompanying drawings, will shown how the invention can be carried into effect. In the drawings:

FIG. 5 shows a variant of the two-directional suspension of reduced overall height;

FIG. 6 shows a constructional variant of the device of FIG. 3;

FIGS. 10 and 11 show details of the forms of securing of the system shown in FIG. 6; and FIG. 12 is an elevation of a light helicopter having an anti-vibration suspension according to the invention.

Figure 1:
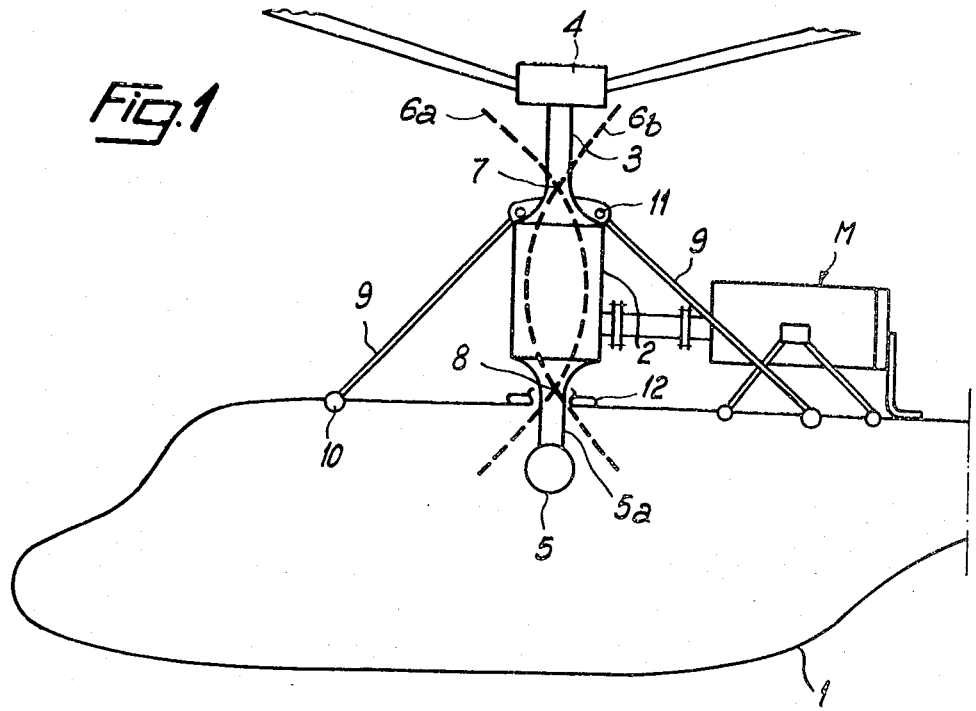
FIG. 1 is a diagrammatic elevation of a helicopter having a suspension system according to the invention.

Referring to FIG. 1, a helicopter fuselage 1 carries at the top a system embodied by a main transmission box 2 topped by a mast 3 forming a shaft for a lift rotor 4 disposed at the top end of mast 3. A driving unit M drives rotor 4 via box 2, the connecting shaft between the integers M and 2 having provision to enable them to make reduced longitudinal and vertical out-of-alignment movements.

The rotor forms one ballast; a second ballast, 5, in the form of a weight disposed opposite the first ballast and on the same vertical axis is secured to the bottom of box 2 by way of a flexible mast 5a. The two ballasts 4, 5 at the ends of the masts 3 and 5a and of the box 2 form a rigid resilient system which can vibrate and produce a deformed shape 6a, 6b having two nodes 7, 8. The connections to the fuselage structure are disposed at the nodes 7, 8.

Figure 2:
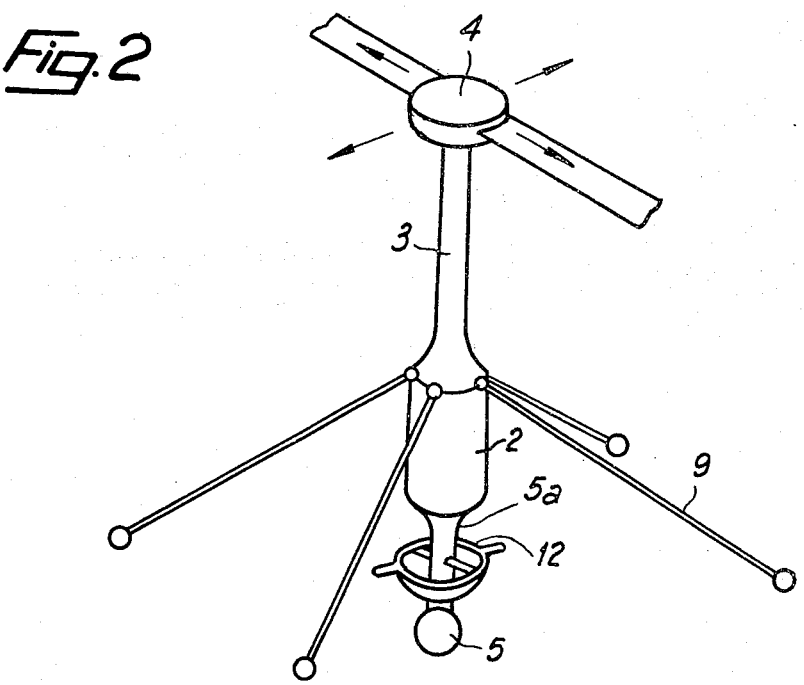
FIG. 2 shows a construction which is effective in two directions.

Accordingly, four rods, as 9, which are articulated at their ends take up the forces applied to the rotor head and, by way of pivot points 10, connect the fuselage structure to the top part of the casing 2 at pivot points 11 disposed substantially in the plane of the top node 7. At the bottom node 8 the fuselage 1 is connected to the vertical system formed by the box and the mast, for instance, by means of a universal joint 12 or of a "flector" adapted to transmit the rotor torque, as shown in the perspective view in FIG. 2.

As a rule, and more particularly in the case of existing craft, the required space is not available below the box, since such base is usually fully taken up in a helicopter. The construction shown in FIG. 3 obviates such a disadvantage. As in the previous case, rotor 4 forms the first ballast; the second additional ballast is split and secured to a cross-beam 13 having an annular widening 14 so that is can be rigidly secured to the underside of transmission box casing 2. The two arms 15, 16 of beam 13 extend laterally from part 14 on either side of the fuselage longitudinal axis 17 and carry a weight 18 at each of their ends.

The nodes of the distorted shape caused by longitudinal vibrations, represented by arrows 19, are disposed at a place 20, on which the rods 9 converge, and at places 21, 22 where the beam 13 is secured to the structure. The latter beam securing places are in the form of flexible connections such as flexible bearings which operate in compression and which can make reduced lateral movements.

A ballasted cross-beam of this kind which is secured to the bottom of transmission box 2 also enables the beam to operate as a resonator adapted to withstand purely vertical vibrations coming from the rotor; however, vertical vibrations are the least disturbing.

Figure 4:
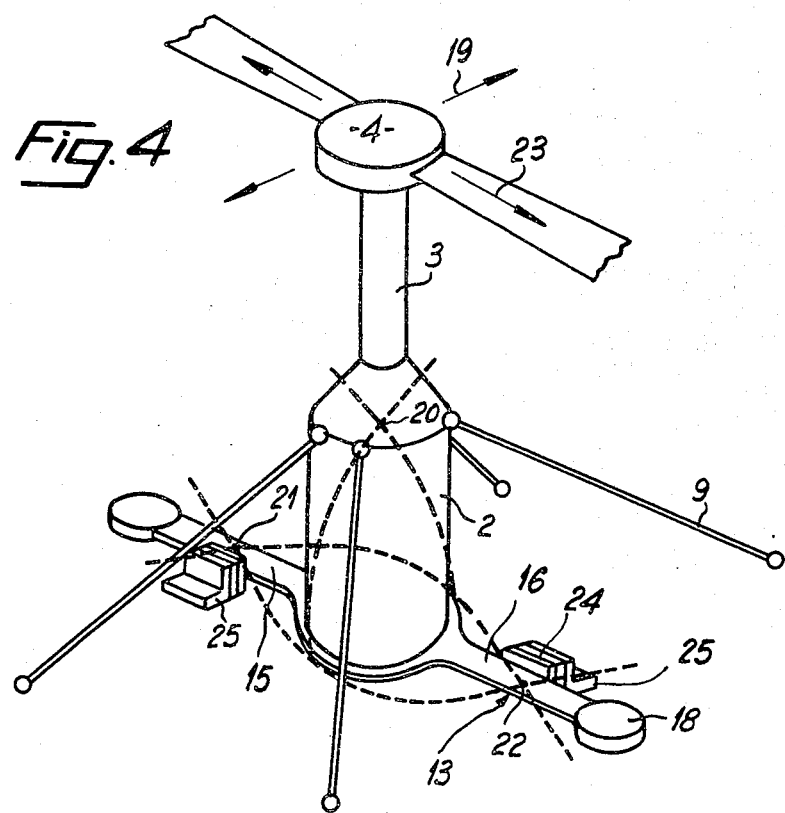
FIG. 4 is a diagrammatic perspective view of a rotor system having a uni-directional suspension combined with a resilient box bottom suspension.

Referring to the variant of FIG. 4, rotor mast 3 bearing the rotor 4 forming the top ballast experiences not only longitudinal vibrations 19 but also lateral vibrations 23. The longitudinal vibrations 19 are taken up by cross-beam 13, which has its ends ballasted, and the lateral vibrations 23 are filtered at the distortion nodes 21, 22 of beam 13 by means of resilient abutments 24, such as abutments made of elastomeric laminations. The abutments 24 are disposed substantially at the nodes 21, 22 so as to withstand the rotor torque, being connected to the beam arms 15, 16 and, for instance by way of angle-members, as 25, to the fuselage structure.

Figure 3:
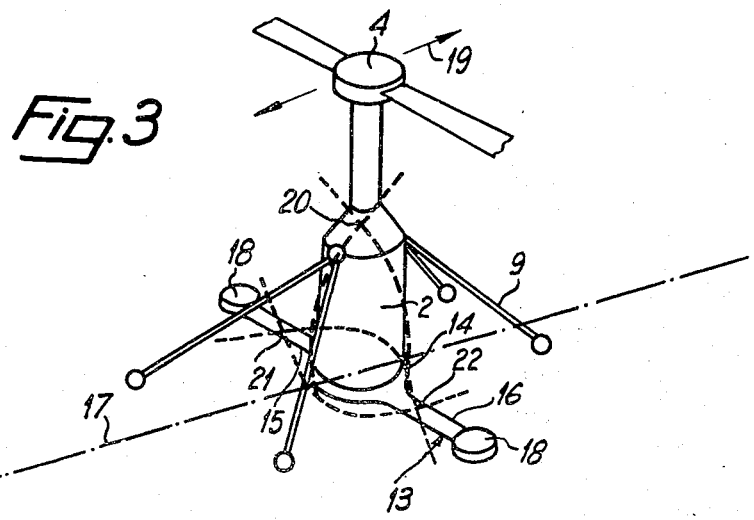
FIG. 3 is a diagrammatic perspective view of a suspension system according to the invention, the suspension being operative uni-directionally.

In the embodiment shown in FIG. 5, the bottom of the transmission box has the beam 13 of FIG. 3, but the beam is not directly connected to the structure and the two nodes 21, 22, an intermediate beam 26 being interposed between the elongated vibrating rigid assembly and the fuselage structure. Beam 26 comprises a flat circular disc 27 which is connected to the positions 21, 22 of beam 13 and which has arms 28, 29 disposed in the direction of the helicopter longitudinal axis. Each arm 28, 29 carries at its end a weight 30, the system formed by the ring 27 and the arms 28, 29 forming the beam 26. When the top of the rotor experiences longitudinal and transverse vibrations, the disc 27 distorts in its plane, the distortion having two nodes 31, 32 which are used for the connection to the structure.

Referring to FIG. 6, casing 2 has a single cross-beam 33 which is secured to the bottom of casing 2 and which carries a weight 34 at each end.

Beam 33 has vertical inertia and longitudinal inertia such that the distortion pattern is of the two-node kind with a double bottom node 35, 36, the position of the bottom node being the same for longitudinal and for transverse vibrations, for since inertia weights and identical lengths are involved, the two nodes 35, 36 are in duplicate and are disposed at the same positions for both kinds of vibration.

Figure 7:
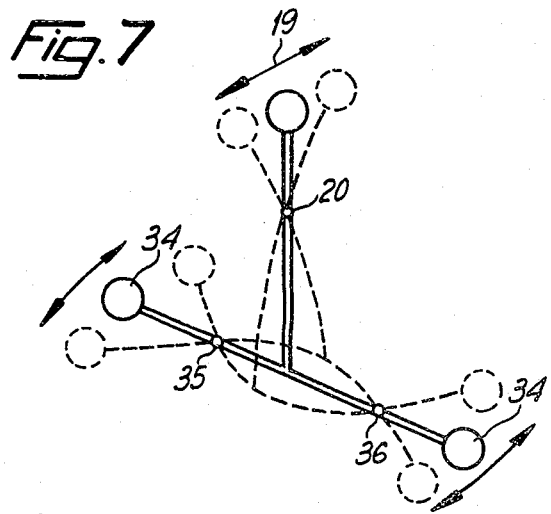
FIGS. 7, 8 and 9 are diagrammatic views showing the behaviour of the variant of FIG. 6.

FIG. 7 shows two-node type distortion caused by longitudinal vibrations with beating of the weights 34 in the horizontal plane.

Figure 8:
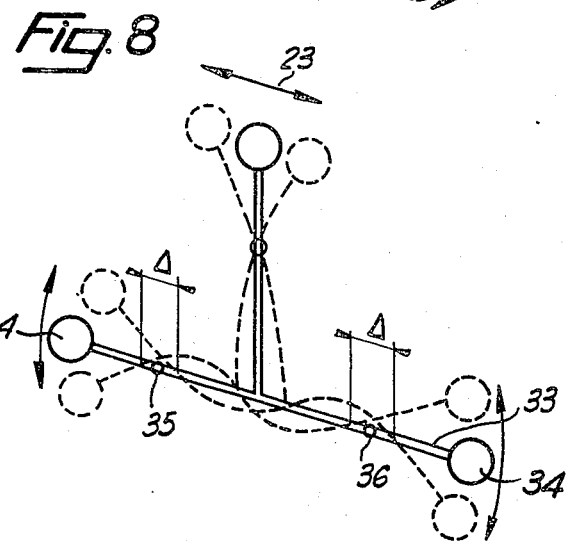

FIG. 8 shows two-node type distortion due to lateral vibrations, with beating of the weights 34 in a vertical plane and a slight alternate lateral shifting of the two nodes 35, 36. The total shift of the nodes is indicated by reference Δ.

Figure 9:
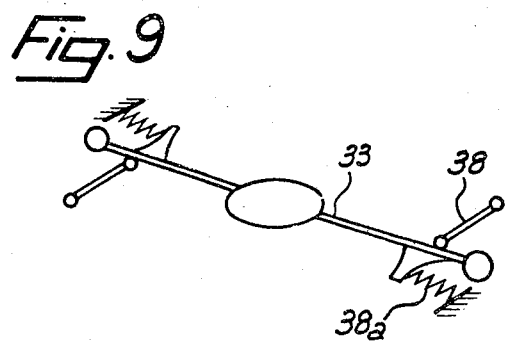

In this case of just a single ballasted cross-beam providing both kinds of vibration, provision must be made for the beam to shift laterally. To this end, the nodes can be connected to the structure (at places 35 and 36) by way of a plain bearing 37 (visible in FIGS. 6, 10 and 11) with resilient restoration, for instance, a bearing made of an elastomer which may or may not be laminated. Each node can also be connected to the structure by means of two rods 38 which are shown in FIG. 9 and which are swivel mounted at their ends on beam 33 and on the structure and which are associated with a resilient transverse restoring or return element 38a which provides transverse location of the system while allowing it some freedom of transverse movement. The rods 38 are adapted to withstand the rotor reaction torque.

Referring to the helicopter shown in FIG. 12, the system embodied by motor 39, reducer casing 40, rotor mast 41 and rotor hub 42 is used to form a vibrating system whose vibration mode, with its two nodes 43, 44 corresponds to approximately 0.8 times the frequency which it is required to neutralize.

To locate the node 44 disposed between motor 39 and reducer 40, such motor and such reducer are interconnected by a rigid element adapted for flexible bending. The second node is disposed above the reducer 40 at a place 43 whose position depends upon the length and rigidity of mast 41 and upon the weight of rotor 42. The mounting points of the vibrating system are located at the two nodes 43, 44.

The torque arising from the reducer is taken up at the bottom node 44, and the means providing a connection with fuselage structure 45 can be a universal joint or a flector or an ordinary flange connection, in which event the flange itself or the mechanical floor 46 of the craft acts as a flexible diaphragm.

The forces applied to the top of the rotor are taken up by a system of rigid rods 47 which connect the structure by way of pivot points 48 and the top node 43 to the vibrating system.

The invention is of use for all aircraft which have at least one main rotor producing vibrations.

I claim:

1. An assembly for securing a main rotor of a helicopter to the fuselage therof, the assembly being adapted to prevent vibrations from being transmitted from the rotor to the fuselage, wherein the rotor mast and the elements rigidly secured thereto form a rigid but resiliently deformable, vertically elongated system ballasted near its upper and lower ends and having at least one flexible vertically elongated intermediate portion, the system being adapted to vibrate in a vibration mode causing vibration nodes to appear in vertically spaced parts of the flexible vertically elongated portion, the connecting elements between such system and the fuselage being disposed at such vertically spaced nodes.

2. An assembly for securing a main rotor of a helicopter to the fuselage thereof, the assembly being adapted to prevent vibrations from being transmitted from the rotor to the fuselage wherein the rotor mast and the elements rigidly secured thereto form a rigid but resiliently deformable elongated system ballasted near its ends and having flexible intermediate portions, the system being adapted to vibrate transversely at a natural frequency very slightly below the frequency to be removed, in a vibration mode causing vibration nodes to appear in the flexible portions, the connecting elements between such system and the fuselage being disposed at such nodes, said elongated system connected to the fuselage at the top node nearest the rotor by way of a rigid securing adapted to transmit horizontal and vertical forces and at the bottom node by way of a flexible device adapted to transfer to the fuselage the driving torque applied to the elongated system and to transmit horizontal forces with the possibility of slight lateral movements.

3. An assembly for securing a main rotor of a helicopter to the fuselage thereof, the assembly being adapted to prevent vibrations from being transmitted from the rotor to the fuselage wherein the rotor mast and the elements rigidly secured thereto form a rigid but resiliently deformable elongated system ballasted near its ends and having flexible intermediate portions, the system being adapted to vibrate transversely at a natural frequency very slightly below the frequency to be removed, in a vibration mode causing vibration nodes to appear in the flexible portions, the connecting elements between such system and the fuselage being disposed at such nodes, said elongated system substantially straight and vertical and, with the rotor forming the ballast at the top end, the main transmission box forming a central weight, a ballast disposed at the bottom end, the intermediate flexible portions being comprised between such box and each of the two ballasts.

4. An assembly according to claim 3, wherein the bottom ballast is an extra weight.

5. An assembly according to claim 3 wherein the bottom ballast is the rotor-driving motor.

6. An assembly for securing a main rotor of a helicopter to the fuselage thereof, the assembly being adapted to prevent vibrations from being transmitted from the rotor to the fuselage wherein the rotor mast and the elements rigidly secured thereto form a rigid but resiliently deformable elongated system ballasted near its ends and having flexible intermediate portions, the system being adapted to vibrate transversely at a natural frequency very slightly below the frequency to be removed, in a vibration mode causing vibration nodes to appear in the flexible portions, the connecting elements between such system and the fuselage being disposed at such nodes, said elongated system comprising a vertical straight portion comprising the main transmission box and the rotor separated by an intermediate flexible portion, and a portion which is transverse to the first portion and which is rigidly secured to the base thereof and which comprises flexible portions terminating in ballasts.

7. An assembly according to claim 6 wherein the transverse portion is perpendicular to fuselage length and forms an inverted T with the first portion.

8. An assembly according to claim 7, wherein the stroke of the inverted T is disposed along the fuselage longitudinal axis.

9. An assembly according to claim 7, wherein the means connecting the flexible portions of the transverse part are resilient securing positions.

10. An assembly according to claim 7, wherein the elements for connecting the flexible portions of the transverse part allow transverse shifting of such portions.

11. An assembly according to claim 6, wherein the transverse part comprises a first portion perpendicular to fuselage length and forming an inverted T with the first part, and a second portion which extends in the direction of fuselage length and which is assembled resiliently to the first part near each of its two flexible portions, such second portion being connected to the fuselage by its own flexible portions.

* * * * *